United States Patent [19]

Wynosky et al.

[11] Patent Number: 4,711,607
[45] Date of Patent: Dec. 8, 1987

[54] HIGH SPEED AUGER VENTURI SYSTEM AND METHOD FOR CONVEYING BULK MATERIALS

[75] Inventors: Charles E. Wynosky, Minersville, Pa.; Joseph Mraz, Plant City, Fla.

[73] Assignee: Coalair Systems, New York, N.Y.

[21] Appl. No.: 790,056

[22] Filed: Oct. 22, 1985

[51] Int. Cl.[4] .................. B65G 53/48; B65G 53/66
[52] U.S. Cl. ..................... 406/30; 406/61; 406/194
[58] Field of Search .............. 406/30, 61, 93, 144, 406/153, 194

[56] References Cited

U.S. PATENT DOCUMENTS

| | | |
|---|---|---|
| 267,318 | 11/1882 | Beach . |
| 531,160 | 12/1894 | Claybourne . |
| 749,206 | 1/1904 | Limbert . |
| 1,053,014 | 2/1913 | Cron . |
| 1,185,118 | 5/1916 | MacMichael . |
| 1,243,892 | 10/1917 | Strong . |
| 1,454,979 | 5/1923 | Muhlfeld et al. . |
| 1,553,539 | 9/1925 | Kinyon . |
| 1,566,325 | 12/1925 | Hansen . |
| 1,567,383 | 12/1925 | Power . |
| 1,675,090 | 6/1928 | Burns et al. . |
| 1,686,713 | 10/1928 | Scott ................... 406/194 |
| 1,772,244 | 8/1930 | Crites ................... 406/61 |
| 1,789,096 | 1/1931 | Bernert . |
| 1,796,215 | 3/1931 | Peikert . |
| 1,804,565 | 5/1931 | Morrow . |
| 1,889,480 | 11/1932 | Kelley . |
| 1,924,675 | 8/1933 | Bernert . |
| 1,941,572 | 1/1934 | Morrow . |
| 1,941,573 | 1/1934 | Morrow . |
| 2,141,920 | 12/1938 | Lenhart . |
| 2,247,448 | 7/1941 | Morrow . |
| 2,268,991 | 1/1942 | Morrow . |
| 2,272,564 | 2/1942 | Kuever, Jr. . |
| 2,299,470 | 10/1942 | Davis . |
| 2,695,265 | 11/1954 | Degnen . |
| 2,821,346 | 1/1958 | Fisher . |
| 2,916,441 | 12/1959 | Kruse, Jr. . |
| 2,971,679 | 2/1961 | Pavia . |
| 3,152,839 | 10/1964 | Edwards . |
| 3,186,769 | 6/1965 | Howlett, Jr. . |
| 3,268,266 | 8/1966 | Brown ................... 406/30 |

(List continued on next page.)

FOREIGN PATENT DOCUMENTS

| | | |
|---|---|---|
| 2149262 | 5/1973 | Fed. Rep. of Germany . |
| 685365 | 1/1953 | United Kingdom . |
| 1020543 | 2/1966 | United Kingdom . |
| 659484 | 4/1979 | U.S.S.R. ............ 406/61 |
| 779211 | 11/1980 | U.S.S.R. ............ 406/61 |

Primary Examiner—Jeffrey V. Nase
Attorney, Agent, or Firm—Brumbaugh, Graves, Donohue & Raymond

[57] ABSTRACT

An auger venturi conveying system for particulate materials includes a hopper-fed auger conveyor section for transporting the particulate material toward the discharge end of a barrel and a venturi arrangement for non-turbulent mixing of the material transported through the barrel with a pressurized gas flow. The venturi arrangement comprises a plenum chamber surrounding the barrel of the auger conveyor section adjacent the discharge end, a venturi pipe coupled to the plenum chamber having a tapered section leading to a constriction, and a jet member within the venturi pipe coupled to the discharge end of the barrel and extending approximately to the constriction. The outer surface of the jet member cooperates with the interior surface of the tapered section of the venturi pipe to form a narrow annular passage between the plenum chamber and the constriction of the venturi pipe. The venturi pipe is coupled at its other end to a conduit. A gas flow is created in the venturi pipe by introducing a pressurized gas into the plenum chamber. The width of the annular passage is adjusted to obtain a desired pressure difference between the plenum chamber and a region of the conduit adjacent the venturi pipe. Blowback prevention is achieved in the system by providing pressure transducers in the plenum chamber and in the region of the conduit adjacent the venturi pipe, and a controller responsive to the signals from the pressure transducers for reducing the rotational speed of the auger conveyor if the pressure difference falls below a specified value.

14 Claims, 4 Drawing Figures

U.S. PATENT DOCUMENTS

| | | |
|---|---|---|
| 3,370,890 | 2/1968 | Morgan . |
| 3,372,958 | 3/1968 | Black . |
| 3,424,501 | 1/1969 | Young . |
| 3,460,869 | 8/1969 | Herr . |
| 3,588,180 | 6/1971 | Herr . |
| 3,602,552 | 8/1971 | Morgan . |
| 3,693,842 | 9/1972 | Cozzarin et al. . |
| 3,975,058 | 8/1976 | York . |
| 4,009,912 | 3/1977 | Mraz . |
| 4,111,492 | 9/1978 | Mraz . |
| 4,480,947 | 11/1984 | Nagasaka ............... 406/30 |

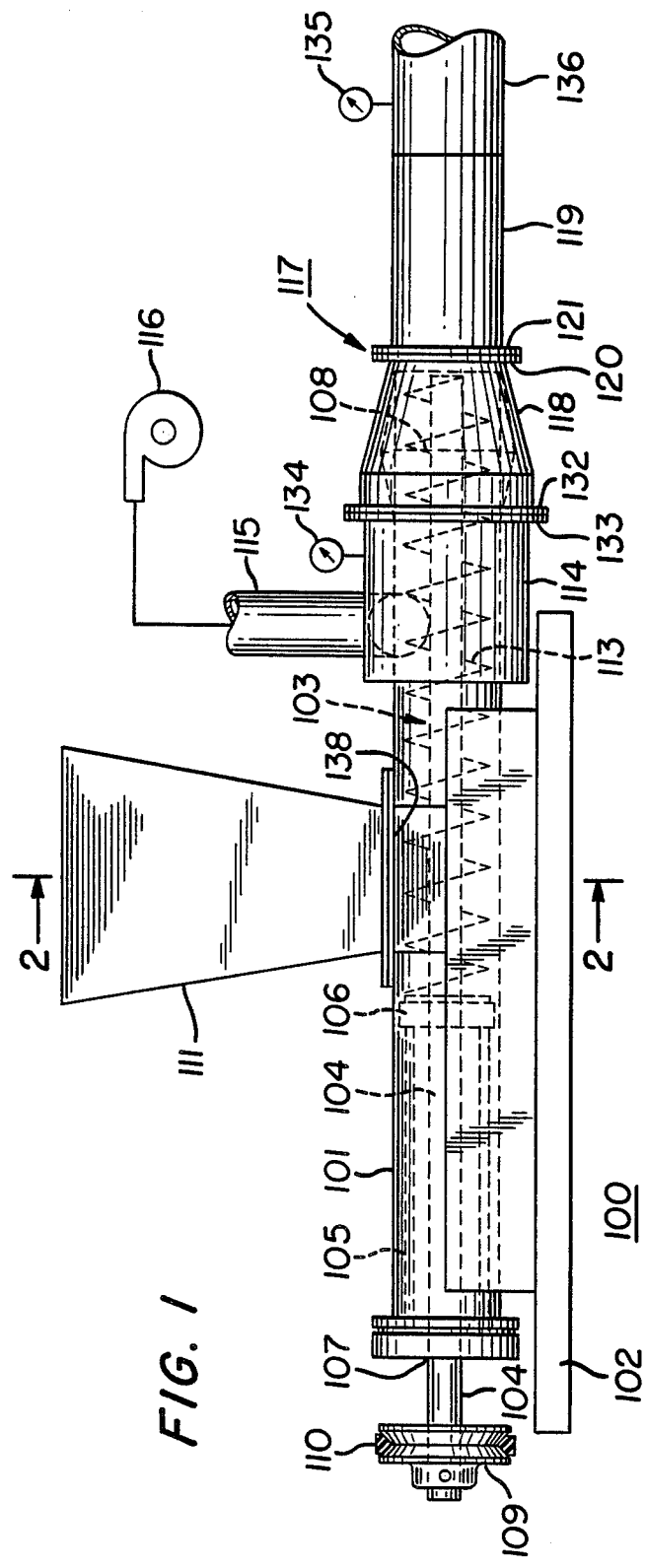
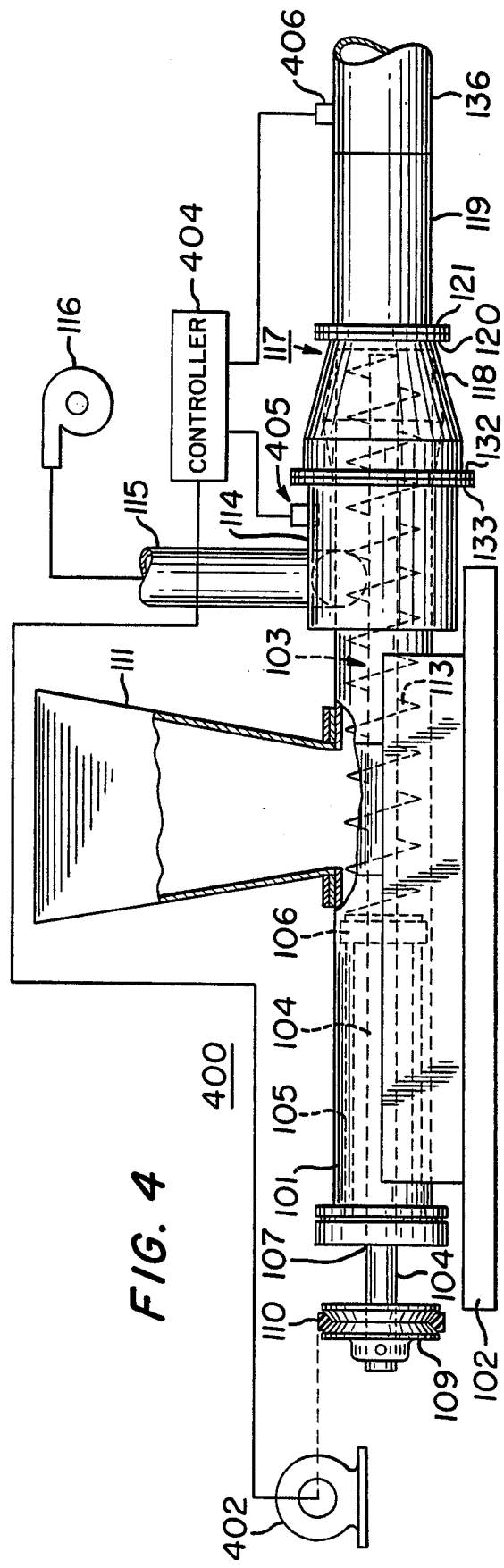

HIGH SPEED AUGER VENTURI SYSTEM AND METHOD FOR CONVEYING BULK MATERIALS

BACKGROUND OF THE INVENTION

The present invention relates to apparatus and methods for conveying bulk materials in the form of particles through a conduit, such as a pipeline or hose, and more particularly to apparatus and methods in which the particulate material is first transported at high speed through a barrel by an auger conveyer, and then inserted within an envelope of pressurized flowing gas adjacent to the exit end of the barrel to continuously pneumatically propel the material through the conduit.

Pneumatic conveying systems having auger conveyor sections are known in the art and have been in use for many years for transporting various particulate materials, such as pulverized coal, portland cement, grain, pulverized ore, etc., through pipelines and other conduits. Such systems, which are described, for example, in U.S. Pat. Nos. 1,553,539, 1,941,512, 1,941,573, 2,299,470, 3,370,890, 3,602,552 and 3,693,842, typically comprise a motor driven auger conveyor rotatably mounted within a barrel, a gravity-fed hopper for supplying particulate material to the auger conveyor through an opening in the barrel, and a mixing chamber situated at the discharge end of the barrel where the material ejected by the auger conveyor is subjected to one or more jets of pressurized air or other gas. The mixture of material and gas thus formed is propelled by the pressurized gas through a conduit connected to the mixing chamber.

Conventional pneumatic conveying systems with auger conveyor sections have the drawback in that the mixing of the pressurized gas with the particulate material in the mixing chamber produces considerable turbulence in the mixture transported through the conduit. Such turbulence is undesirable in that it increases the frequency of contact of the particulate material with the conduit walls during transport and therefore aggravates frictional losses in the conveying system. Where the material being transported is abrasive or corrosive, increased contact of such material with the conduit walls can also reduce the useful life of the conduit.

Pneumatic conveying systems for particulate materials have also been devised in which the mixing of material with the gas takes place in a venturi pipe through which pressurized gas flows. By introducing the particulate material into the relatively high velocity gas flow in the constriction or throat of the venturi pipe, mixing of the material with the gas occurs with little turbulence, and therefore the resulting mixture may be propelled through the conduit with reduced frictional loss and less wear of the conduit walls.

Conventional venturi conveying systems, such as those described in U.S. Pat. Nos. 3,186,769 and 4,009,912, have also been in use for many years in a variety of conveying applications. In such systems, the particulate material to be mixed with the gas is supplied to the venturi pipe via a chute having a discharge end located near the constriction of the venturi pipe, where a vacuum (negative pressure) created by the high velocity gas flow therein acts to draw the material from the chute into the venturi pipe. Because the material being transported does not always flow freely in the chute, the transport rate in a conventional venturi conveying system is difficult to control and is subject to variations on account of changes in the properties of the material being conveyed, such as density, moisture content, particle size, etc. Moreover, a conventional venturi conveying system may not provide a satisfactory material-to-air conveyance ratio for materials that are not sufficiently free flowing in the chute to allow the negative pressure in the venturi pipe to draw such materials from the chute at an adequate rate.

Both the conventional auger conveyor type and the conventional venturi type pneumatic conveying systems are subject to the problem of "blowback", which occurs when there is a blockage in the conduit that results in excessive pressure in the conduit and produces an undesirable back flow of the gas and product into the hopper in the auger conveyor type system and into the chute in the venturi type system. Known solutions to the blowback problem have included the use of a flapper valve or an air lock in the auger barrel or in the chute of the venturi type system to prevent back flow of gas and product when the pressure in the conduit becomes excessively high. These mechanical devices for avoiding blowback have the disadvantage in that they are subject to binding, clogging and wear from contact with abrasive or corrosive materials, and therefore require substantial maintenance.

Another known solution to the blowback problem used in auger conveyor type systems provides for tapering of the barrel near the discharge end or alterations in the flights of the auger to produce a plug of material which seals the barrel against back flow of the gas. Such modifications to the barrel or the auger flights for forming product-plug seals have the disadvantage, however, in that they tend to reduce the rate at which the material may be transported or, in the case of the modifications to the auger flights, must be tailored to the particle size of the material being conveyed. Maintaining a product plug seal also causes increased energy consumption.

Accordingly, a need exists for a pneumatic conveying system for particulate materials which minimizes turbulence in the material-gas mixture being transported by the conduit and which provides continuous transport of the material at an easily controlled constant rate and satisfactory material-to-air conveyance ratio for a wide range of material properties, including materials that are not freely flowing. Furthermore a need exists for a pneumatic conveying system in which blowback can be prevented without using mechanical expedients such as flapper valves, air locks, or an auger conveyor that produces a product-plug seal.

SUMMARY OF THE INVENTION

The foregoing and other disadvantages of the prior art are overcome and the aforementioned needs fulfilled, in accordance with the present invention, by providing a venturi mixing arrangement in combination with an auger conveyor section. The auger conveyor section includes a cylindrical barrel enclosing a rotatably mounted auger conveyor for transporting particulate material towards a discharge end of the barrel and for ejecting the material therefrom, a motor coupled to rotate the auger conveyer in an appropriate direction and a hopper for supplying material to the auger conveyor through an opening in the barrel. The venturi arrangement includes a plenum chamber surrounding the barrel adjacent the discharge end, a venturi pipe coupled to the plenum chamber enclosing the discharge end of the barrel and having a tapered section leading to a constriction located beyond the discharge end, and a jet member within the venturi pipe coupled to the discharge end and extending approximately to the constriction. The jet member has an outer surface which is shaped to conform with the interior surface of the tapered section of the venturi pipe to form a relatively narrow annular passage from the plenum chamber to the constriction of the venturi pipe, and an axial bore for channeling the material ejected from the barrel to the constriction. The plenum chamber has a port for introducing pressurized gas for creating a gas flow in the venturi pipe, and the venturi pipe includes means for coupling to a conduit. Preferably, the auger extends to the end of the jet member adjacent the constriction of the venturi pipe.

In the preferred embodiment of the invention, the interior surface of the tapered section of the venturi pipe and the outer surface of the jet member are mutually shaped, sized and positioned to provide a predetermined pressure difference between the plenum chamber and the region of the conduit adjacent the venturi pipe. In addition, as well as controlling the volume of air, there are provided pressure sensors for the plenum chamber and the conduit region adjacent the venturi pipe and a controller responsive to the pressure sensors for controlling the rotational speed of the auger conveyer to decrease the supply rate of material to the conveyor when the pressure difference between the plenum chamber and conduit region adjacent the constriction falls below a specified value.

In accordance with another aspect of the present invention, there is also provided a novel method for pneumatically conveying particulate material which includes the steps of continuously transporting the particulate material through a barrel by an auger conveyor therein to cause the material to be introduced from a discharge end of the barrel into a vortex created by a venturi. The venturi creates a pressurized gas flow having a relatively high pressure, high velocity zone and a relatively low pressure, higher velocity zone in the vicinity of the discharge end of the barrel, thus creating a negative pressure zone at the end of the barrel, injecting the material supplied from the barrel into the gas flow in the relatively high pressure, high velocity zone, and coupling the gas flow with the injected material to a conduit.

BRIEF DESCRIPTION OF THE DRAWINGS

The present invention may be better understood with reference to the following detailed description of exemplary embodiments, taken in conjunction with the accompanying drawing, in which:

FIG. 1 is a side elevation of an auger venturi conveying system according to one embodiment of the present invention;

FIG. 4 is a side elevation of an auger venturi conveying system according to another embodiment of the present invention with parts shown in section and parts shown schematically.

Throughout the figures of the drawing, the same reference numerals and characters are used to denote like features, components or structural parts of the illustrated apparatus.

DETAILED DESCRIPTION

Figure 2:
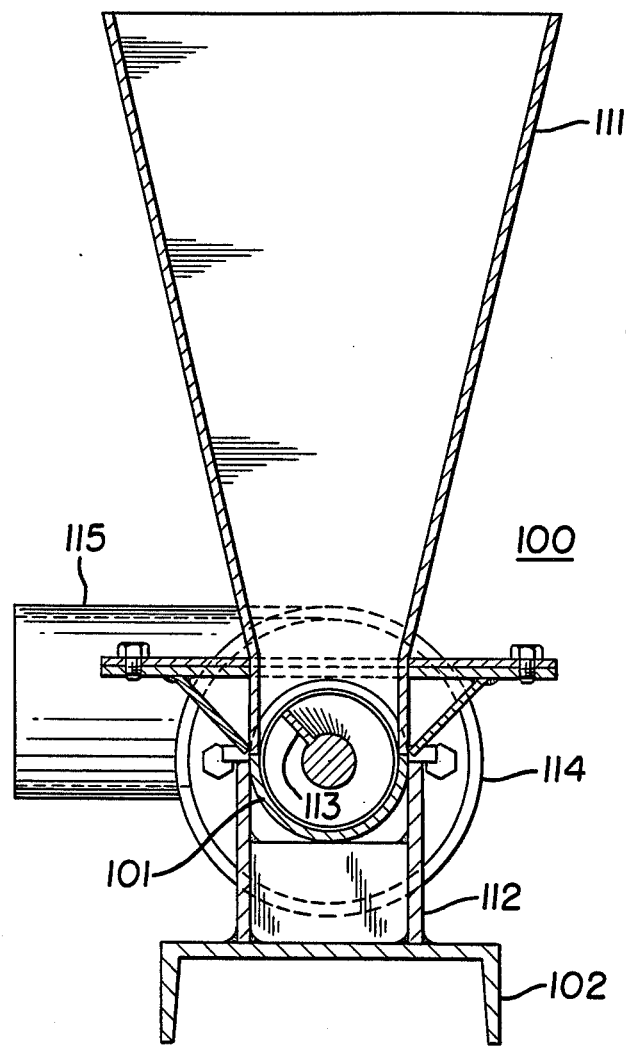
FIG. 2 is a transverse sectional view of the auger venturi conveying system of FIG. 1 taken along line 2—2 of FIG. 1.
Figure 3:
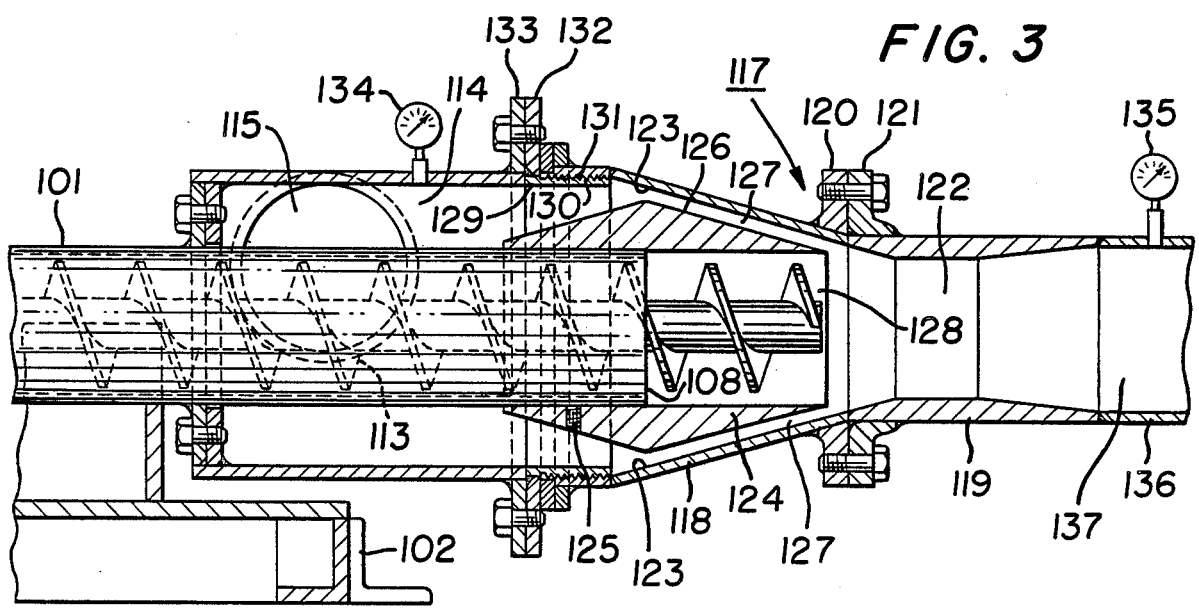
FIG. 3 is a sectional view on a larger scale particularly showing the venturi arrangement of the conveying system of FIG. 1.

Referring now to FIGS. 1, 2 and 3, the auger venturi conveying system 100, according to one embodiment of the present invention, includes a cylindrical barrel 101 supported on a base 102. The barrel 101, which has an inside diameter of approximately five inches, houses a cantilevered four-foot long, four inch diameter auger conveyor 103. The auger conveyor 103 has a shaft 104 which projects through a bearing 105 supported by suitable bushings 106 (only one of which is illustrated in FIG. 1) and extends out of the far end 107 of the barrel 101. The bearing 105 and the bushings 106 serve as rotatable mounting and the main support fer the auger conveyor 103, which extends throughout the length of the barrel 101. The shaft 104 of the auger conveyor 103 is coupled to a 15 H.P. motor (402 in FIG. 4) through a pulley 109 and a drive belt 110.

Material to be transported by the conveying system 100 is supplied by a vertically disposed, funnel-shaped hopper 111 mounted to the support frame 112 of the barrel 101, as shown in FIG. 2. The material in the hopper 111 drops onto the auger conveyer 103 through an opening 138 in the barrel 101. The auger conveyor 103 is driven by the motor (not shown) to rotate in a direction which causes the flights 113 of the auger to push the material towards the discharge end 108 of the barrel 101, such that the material is ejected from the discharge end at a rate and velocity determined by the rotational speed of the auger conveyor 103 and the pitch of the flights 113. The rotational speed of the auger conveyor 103 is advantageously in the range of 750 r.p.m. to 1800 r.p.m. In general, the characteristics of the flights 113 are adjusted in a known manner to the material to be transported. Inasmuch as all of the components of the auger conveyor section of the system 100 are conventional, the details of the design and construction of such components need not be further described.

Located adjacent to the discharge end 108 of the barrel 101 is an annular plenum chamber 114 surrounding the barrel 101 and having an inside diameter of approximately 10 inches. The plenum chamber 114 has a port 115 connected to a blower 116 (illustrated schematically) for introducing pressurized air into the plenum chamber 114. Coupled to the plenum chamber 114 is a venturi pipe 117 enclosing the discharge end 108 of the barrel 101. In the illustrated embodiment, the venturi pipe 117 is constructed in two sections 118 and 119 coupled together by means of flanges 120 and 121 on each section, which are fastened by bolts. One of the sections 118 of the venturi pipe 117 is tapered and leads into a constriction 122 in the other narrower section 119. The narrower section 119 is coupled, as by welding for example, to a conduit 136, such as a pipeline or a hose.

As shown in FIG. 3, the tapered section 118 has a conically shaped interior surface 123, which is coaxial with the barrel 101. Enclosed within the tapered section 118 is a jet member 124 attached to the discharge end 108 of the barrel 101 by a set screw 125 and extending approximately to the constriction 122. The jet member 124 has a conically shaped outer surface 126, which is also coaxial with the barrel 101. The outer surface 126 of the jet member 124 is appropriately shaped to conform with the interior surface 123 of the tapered section 118 to form a narrow annular passage 127 between the plenum chamber 114 and the constriction 122 of the venturi pipe 117. The angle formed by the interior surface 123 of the tapered section 118 and that formed by the outer surface 126 of the jet member 124 are advantageously made equal and in the range of 11° to 15° to the axis of the barrel 101. As shown in FIGS. 1, 3 and 4, the flight 113 of the auger conveyor 103 extend substantially to the end of the jet member 124 adjacent the constriction 122. This avoids the formation of a product plug at the exit end of the auger and facilitates discharge of the material into the fluid stream.

The blower 116 is of a conventional type which provides airflow at a volume rate and pressure suited to the material being conveyed and the length of conduit used. For example, a volume flow rate of approximately 750 C.F.M. and a pressure in the range of 12 to 15 psig are suitable for transporting anthracite culm through a pipeline of approximately 300 feet. It is advantageous to use blowers that provide volume flow rates in the range of 600 C.F.M. to 1500 C.F.M. The pressure required to maintain such volume flow rates ordinarily depends on the length of the conduit and the properties of the material being transported. Although blowers are preferred to minimize costs, if the required pressure is greater than that which is available from blowers, compressors may be used to provide the pressurized air to the plenum chamber 114.

With air flowing through the venturi pipe 117, there is created a relatively high pressure, low velocity flow region at the wide end of the tapered section 118 and a relatively low pressure, high velocity flow region in the narrow annular passage 127, which extends into the constriction 122. The portion of the relatively low pressure, high velocity flow region that extends into the constriction 122 is commonly referred to as the vena contracta of the venturi flow. The jet member 124 has an axial bore 128 for channeling the material supplied from the barrel 101 to the constriction 122, or more specifically, into the vena contracta of the venturi flow.

For a volume flow rate in the aforementioned range, a vacuum (negative pressure) in the range of 12 to 15 inches of Hg is created in the constriction 122 and the bore 128 of the jet member when no material is being injected into the constriction. Because the vacuum is the greatest along the axis of the constriction 122 and falls off with distance away from the axis, the material particles that are introduced into the constriction 122 are accelerated in such a manner that the larger and denser particles tend to converge towards the center of the airstream. Moreover, mixing of the particulate material with the airstream in such a manner produces minimal turbulence in the mixture flowing from the venturi pipe 117. For that reason, when such a mixture is propelled through the conduit contact of the material with the conduit walls is minimized.

Although the vacuum in the constriction 122 of the venturi pipe 117 diminishes and may approach zero (i.e., atmospheric pressure) when the particulate matter is introduced into the constriction, a pressure difference in the range of 3 to 10 psi should be maintained between the plenum chamber 114 and a region 137 of the conduit 136 adjacent the constriction 122 for advantageous operation of the conveying system 100. Such pressure difference may be adjusted by varying the width of the annular passage 127 of the venturi pipe 117. For that purpose, the position of the tapered section 118 with respect to the jet member 124 is made adjustable by making the coupling between the plenum chamber 114 and the tapered section 118 in the form of a thread fitting 129 attached to the plenum chamber by a flange 132 that is bolted to a corresponding flange 133 of the plenum chamber, as shown in FIG. 3. The threads 130 on the fitting 129 mate with threads 131 on the interior surface of the wide end of the tapered section 118 to allow the tapered section to be screwed onto the fitting. Accordingly, under normal circumstances, the width of the annular passage 127 may be adjusted by turning the tapered section 118 in one or the other direction to cause the pressure difference between the plenum chamber 114 and the conduit region 137 adjacent the constriction 122 to be within the aforementioned range. Conventional dial type pressure gauges 134 and 135 mounted in fittings in the walls of the plenum chamber 114 and the conduit region 137, respectively, are provided to facilitate the making of such adjustments.

The pressure difference between the plenum chamber 114 and conduit region 137 provides a reliable indication of the onset of blowback, since any blockage or clogging of the conduit that impedes the airflow therethrough will cause the pressure difference to decrease. Therefore, blowback may be prevented by monitoring the pressure difference and by reducing the supply rate of material to the auger conveyor if the pressure difference goes below a specified value, for example 1 psi. The material supply rate is restored when the pressure difference returns to the aforementioned range after the blockage or clog in the conduit clears itself. The monitoring of the pressure difference and the reduction of the material supply rate may be carried out by an operator observing the pressure gauges 134 and 135 and controlling the rotational speed of the auger conveyor 103, or it may be carried out automatically using a mechanical, electromechanical or electronic control system.

Turning now to FIG. 4, there is shown a auger venturi conveying system 400 similar to that of FIGS. 1, 2 and 3 but with the addition of a control system for automatically preventing blowback. The speed of the motor 402 driving the auger conveyor 103 is controllable by a signal from a controller 404. The plenum chamber 114 and the conduit region 137 adjacent the constriction 122 of the venturi pipe 117 are provided with pressure transducers 405 and 406, respectively, mounted in fittings in the walls of those regions. The pressure transducers 405 and 406 may be commercially available units which provide electrical signals corresponding to the pressures in the respective regions where they are located. The signals from the pressure transducers 405 and 406 are provided to the controller 404 which is designed to determine whether the pressure difference between the plenum chamber 114 and the conduit region 137 is above or below a specified valve, e.g., 1 psi. If the pressure difference is equal to or above the specified valve, the controller 404 provides an appropriate signal to the motor 402 for causing the motor to operate at its normal speed. If, however, the pressure difference is below the specified value, the controller 404 provides an appropriate signal to the motor 402 to significantly slow or stop the motor. Alternatively, the controller 404 may be designed to provide continuous control over the speed of the motor 402, in which case the signal from the controller to the motor causes the motor speed to be proportional to the pressure difference, for speeds up to the normal speed. Since the design and construction of a controller for providing the above-specified control functions is well known to one skilled in the control circuitry art, the details of the controller need not be further described.

The above-described auger venturi conveyor systems 100 and 400 in accordance with the present invention are capable of continuously transporting particulate materials having random particle sizes up to particle dimensions equal to the distance between the auger flights. A typical air-to-material conveying ratio for those systems is 14 pounds of solid per one pound of air over a conveying distance of 400 feet. In addition, conveying systems according to the present invention provide highly efficient removal of any moisture from the material being conveyed, owing to a mechanical shearing effect that occurs as the material is accelerated through the negative pressure zone of the venturi pipe which draws moisture from the surfaces of the particles being accelerated. Furthermore, conveying systems according to the present invention afford effective blowback prevention without the use of flapper valves, air locks or product-plug seals.

The exit speed of the material from the auger may be varied to optimize material throughput, product drying, and the like, but generally the auger rotational speed is preferably selected so that the material exit speed approaches that of the air flow through the conveying line.

It will be understood that various modifications and alternations to the exemplary embodiments of the invention described above may be made by those skilled in the relevant arts without departing from the spirit and scope of the invention as defined by the appended claims. For example, the interior surface of the tapered section of the venturi pipe and the outer surface of the jet member need not be conical but may have other tapered shapes, and the width of the annular passage between the plenum chamber and the constriction need not be uniform. Furthermore, means other than screw threads may be used to provide adjustment of the position of the tapered section of the venturi pipe with respect to the jet member, and gases other than air may be used for transporting the particulate material. Of course, the diameter and other dimensions of the auger barrel, verturi, etc., may be varied as needed to suit the rise of the conduit through which the material is to be conveyed.

We claim:

1. A conveying system for particulate material comprising:
   a cylindrical barrel having first and second ends;
   an auger conveyor rotatably mounted within the barrel;
   means for supplying the particulate material to the auger conveyor;
   means for rotating the auger conveyor in an appropriate direction so as to transport the particulate material towards the first end of the barrel;
   a plenum chamber surrounding the barrel adjacent the first end thereof;
   a venturi pipe coupled to the plenum chamber and enclosing the first end of the barrel, the venturi pipe having a first tapered section leading directly to a relatively short constriction located beyond the first end of the barrel and a second tapered section of increasing cross-sections directly downstream of the constriction;
   a jet member within the venturi pipe coupled to the first end of the barrel and extending substantially adjacent to the constriction, the jet member having an outer surface appropriately shaped to conform with the interior surface of the first tapered section of the venturi pipe to form a relatively narrow annular passage from the plenum chamber to the constriction, the jet member having an axial bore for channeling the particulate material transported by the auger conveyor into a region substantially adjacent the constriction of the venturi pipe;
   means for introducing a pressurized gas into the plenum chamber; and
   means for coupling the venturi pipe to a conduit.

2. A conveying system according to claim 1, wherein the interior surface first of the tapered section of the venturi pipe and the outer surface of the jet member are respectively shaped, sized and mutually positioned to provide a predetermined pressure difference between the plenum chamber and a region of the conduit adjacent the constriction of the venturi pipe when gas is flowing in the venturi pipe and the material is being conveyed by the system.

3. A conveying system according to claim 2, wherein the venturi pipe is coupled to the plenum chamber with mating screw threads on the venturi pipe and on the plenum chamber such that the position of the first tapered section of the venturi pipe with respect to the jet member is adjustable by rotating the venturi pipe in one direction or the other.

4. A conveying system according to claim 2, wherein the pressure difference between the plenum chamber and the region of the conduit adjacent the second tapered section of the venturi pipe is in the range of 3 psi to 10 psi for a gas flow rate in the venturi pipe in the range of 600 to 1500 CFM.

5. A conveying system according to claim 2, wherein the interior surface of the first tapered section of the venturi pipe and the outer surface of the jet member are both conical and coaxial with the barrel.

6. A conveying system according to claim 5, wherein the conical interior surface of the tapered section of the venturi pipe forms an angle in the range of 11° to 15° with respect to the axis of the barrel.

7. A conveying system according to claim 1, wherein the means for introducing pressurized gas into the plenum chamber comprises a port in the plenum chamber coupled to a blower.

8. A conveying system according to claim 1, wherein the means for supplying the particulate material to the auger conveyor comprises a vertically disposed, funnel-shaped hopper in communication with the interior of the barrel through an opening therein.

9. A conveying system according to claim 1, wherein the auger conveyor includes a shaft extending axially from the second end of the barrel and the means for rotating the auger conveyor comprises a motor coupled to the shaft for driving the auger conveyor in the appropriate direction of rotation.

10. A conveying system according to claim 9, further comprising first and second pressure sensing means for detecting the pressure in the plenum chamber and in the region of the conduit adjacent the constriction of the venturi pipe, respectively, and controller means responsive to the first and second pressure sensing means for controlling the speed of the motor driving the auger conveyor to decrease the rotational speed of the auger conveyor when the pressure difference between the plenum chamber and the region of the conduit adjacent the constriction of the venturi pipe falls below a specified value.

11. Conveying system in accordance with claim 1 in which the auger conveyor includes a helical flight continuously supported along its length by a shaft which extends along the length of the barrel and the last turn of the flight ends at the discharge end of the barrel.

12. A method for conveying particulate method from a barrel to a conduit comprising:

continuously transporting the particulate material with an auger conveyor through the barrel towards one end thereof to discharge the material therefrom;

creating a pressurized gas flow having in succession a first relatively high pressure, low velocity zone, a first relatively low pressure, high velocity venturi zone surrounding said one end of the barrel, a second relatively high pressure, low velocity zone and a second relatively short, relatively low pressure, high velocity venturi zone, the pressure in said zones being relative to the pressure in the conduit region directly downstream to the second relatively high pressure, low velocity zone;

injecting the particulate material transported through the barrel into the gas flow substantially adjacent the second relatively low pressure, high velocity venturi zone; and coupling the gas flow to the conduit after injection of the particulate material and passage through the second relatively low pressure, high velocity venturi zone and the second relatively high pressure, low velocity zone.

13. A method for conveying particulate material according to claim 12, wherein the rate of the gas flow is in the range of 600 to 1500 CFM and the difference in pressure between the first relatively high pressure, low velocity zone and the conduit region directly downstream of the second relatively low pressure, high velocity venturi zone is in the range of 3 psi to 10 psi.

14. A method for conveying particulate material according to claim 12, further comprising sensing the pressure difference between the first relatively high pressure, low velocity zone and the conduit region directly downstream of the second relatively low pressure, high velocity venturi zone of the gas flow and controlling the quantity of particulate material transported through the barrel when the pressure difference falls below a specified value.

* * * * *